Figures 1, 2:
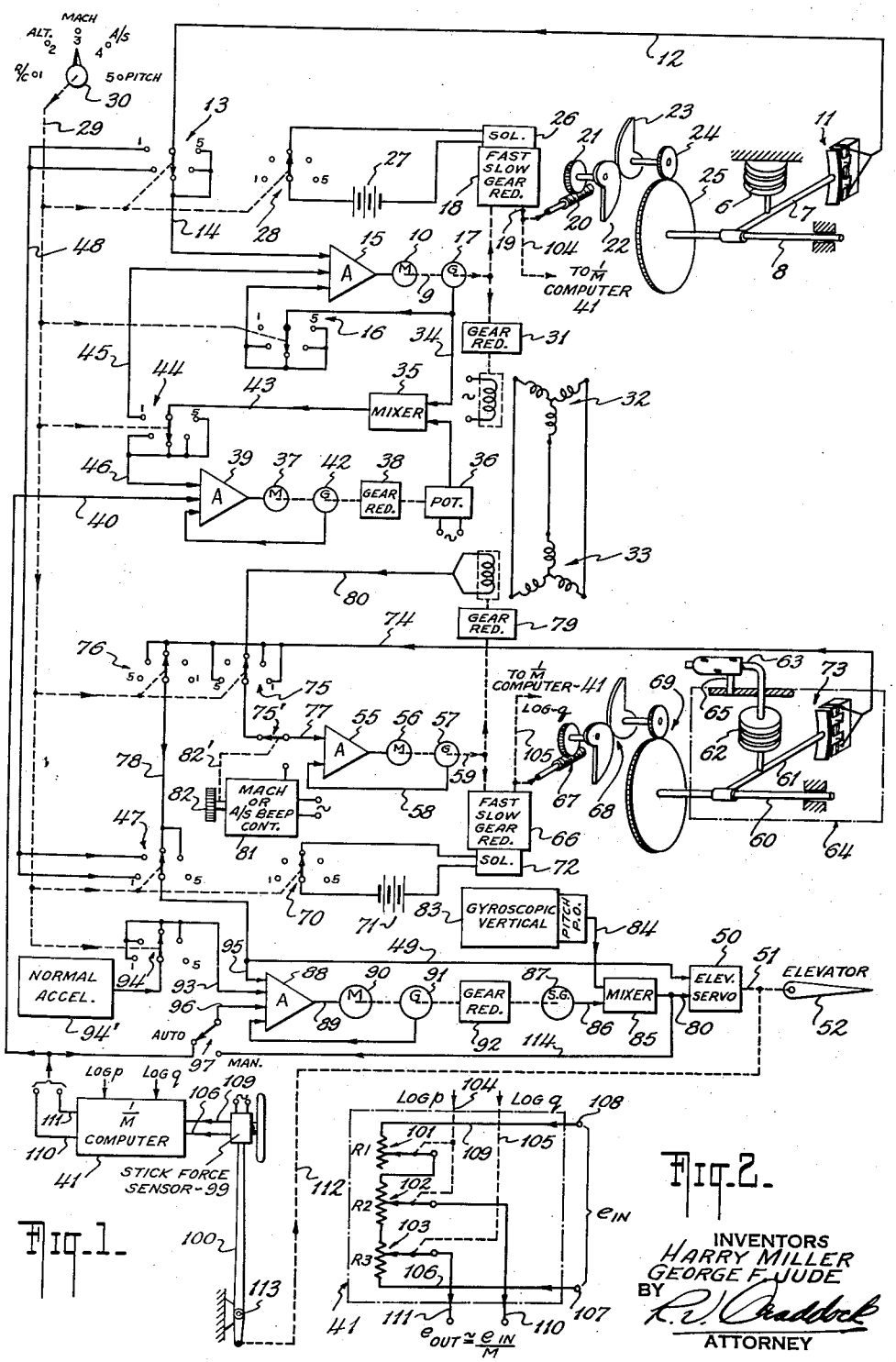

March 6, 1962  H. MILLER ETAL  3,023,616
MACH NUMBER APPARATUS
Original Filed March 15, 1956

INVENTORS
HARRY MILLER
GEORGE F. JUDE
BY
ATTORNEY 3,023,616
MACH NUMBER APPARATUS
Harry Miller, Scottsdale, and George F. Jude, Phoenix, Ariz., assignors to Sperry Rand Corporation, a corporation of Delaware
Original application Mar. 15, 1956, Ser. No. 571,788, now Patent No. 2,936,134, dated May 10, 1960. Divided and this application Apr. 5, 1960, Ser. No. 20,069
6 Claims. (Cl. 73—178)

This invention relates to automatic pilots for aircraft, and more particularly concerns a novel system for controlling the movements of the longitudinal axis of an aircraft in flight.

By the present invention, a longitudinal axis control system is provided that is especially well-suited for an aircraft whose normal cruising speeds range up closely to the threshold of the transonic region. The system includes a mode selector by which the system may be made to control the craft to maintain any one of the following, as desired:

(1) A commanded rate of climb;
(2) An altitude to which the craft has been flown;
(3) A mach number attained by the craft;
(4) An air speed attained by the craft; and,
(5) A reference pitch attitude.

The present application is a division of our copending application Serial No. 571,788, filed March 15, 1956, now U.S. Patent No. 2,936,134, issued May 10, 1960, entitled Longitudinal Axis Control System for Aircraft, and is directed to the Mach number measuring and control features disclosed in that application.

The rate of climb desired in mode 1 above is commanded by the manual operation of a signal generating controller device which simultaneously commands a rate of change of pitch. The pitch rate command causes the pitch attitude of the craft to change at a rate dependent on the output of the controller device, while the climb rate command calls for a pitch attitude that will maintain a climb rate according to that which is commanded. When the desired climb rate is observed to be attained, the controller device is manually restored to a zero signal condition. This removes the pitch rate command, but a memory feature in the system retains the climb rate command so that the desired climb rate continues so long as mode 1 is engaged and no further operation of the controller device occurs.

The controller device can be either a conventional spring loaded pitch knob or a force sensitive element attached to the control column. The force sensor is arranged to be responsive to forces applied to the column in a direction normally used to manually position the elevator.

Ideally, the pitch rate command should be limited inversely according to the true speed of the craft in order to limit the resulting acceleration forces on the craft to safe values. True speed, however, is notoriously difficult to ascertain in the air. Therefore, in the present system, this command is limited inversely according to the Mach number of the craft, since the relationship between true speed and the acceleration forces is virtually the same as that between Mach number and the acceleration forces. Thus, for example, the higher the Mach number in the present system, the less will be the pitch rate command for a given output of the controller device. If the pitch rate command is derived from a column force sensor, an artificial feel results at the column having a constant stick force per "g" characteristic.

The same controller device that is employed in mode 1 for commanding pitch and climb rates is employed in mode 5 for maneuvering the craft in pitch at Mach-compensated rates. The memory feature of mode 1 is inoperative in mode 5.

A separate controller device is employed interchangeably in modes 3 and 4 for commanding desired magnitude changes of the craft's Mach number and airspeed, respectively.

All commands, whether they be pitch rate alone, pitch rate and climb rate together, Mach number, or airspeed, are generated in a manner to produce a smooth transition from the existing state to the state commanded.

A novelly integrated pressure sensing arrangement is employed for providing the mode control signals required for modes 1 to 4 and for providing compensating parameter control signals for the pitch rate commands. The pressure-derived mode control signals mix with a pitch attitude control signal, one at a time, depending on which of the modes 1 to 4 is selected, so as to order such departures from the reference pitch attitude that are necessary to maintain the appropriate rate of climb, altitude, Mach number, or airspeed, as the case may be. A servomechanism drivably connected to the elevator surface of the craft responds to the orders presented by the mixed signals.

The reference pitch attitude is preferably defined principally by a gyroscopic vertical equipped with a signal generator that provides a signal according to variations in pitch. This signal is combined with signal components in the output of an integrator to form the pitch attitude control signal with which the mode control signals are mixed.

In modes 1 to 4, the signal from a linear accelerometer sensitive to accelerations normal to a plane which contains the craft's longitudinal and athwartships axes, i.e., normal to the floor of the craft, is connected to the input of the integrator to provide a path damping signal proportional to aircraft vertical speed. This integrated acceleration component is for the purpose of reinforcing the gyroscopically-derived pitch signal so as to prevent an altitude control instability that might otherwise result when the altitude error to pitch signal ratio is high. A high altitude to pitch ratio is desirable to maintain effective vertical path control.

Further in modes 1 to 4, the pressure-derived mode control signal that mixes with the pitch attitude control signal is also fed via a separate path to the input of the integrator to provide a signal component in the integrator's output according to the sustained error, if any, in the mode control signal. By this expedient, the pressure-sensing arrangement is relieved of the necessity of maintaining a sustained error output in order to control the craft as the modes 1 to 4 demand.

A third signal component in the integrator's output calls for the rate of change of pitch that is commanded by the manipulation of the pitch rate controller device previously referred to. In this regard, the input of the integrator is connected to receive the output of the signal generator actuated by the controller device.

In mode 5, the elevator servomechanism responds to the pitch attitude control signals alone, the pressure-derived mode control signals being disconnected therefrom. The accelerometer and mode control inputs to the integrator are also disconnected in mode 5, so that the pitch attitude control signal is then made up of the gyroscopically-derived pitch signal together with those acceleration and error integral components that are in existence when mode 5 is entered. The retention of the fixed values of these components assists the gyroscopic vertical in maintaining the reference pitch attitude in mode 5.

With the foregoing and other features in view, the present invention includes the novel elements and combinations and arrangements thereof described below and illustrated in the accompanying drawings, in which:

FIG. 1 is a schematic diagram of a preferred embodiment of the present invention; and FIG. 2 is a schematic diagram of an inverse Mach number computer suitable for use in the embodiment of FIG. 1.

The pressure sensing arrangement for providing the control signals required to maintain, as desired, a commanded rate of climb, an altitude to which the craft has been flown, a Mach number attained by the craft, or an airspeed attained by the craft will now be described with the aid of FIG. 1.

Fundamentally, the pressure sensing arrangement consists of a first apparatus sensitive to the static pressure $p$ of the atmosphere proximate the craft, and a second apparatus sensitive to the dynamic pressure $q$ exerted by the atmosphere on the craft as it moves therethrough. Each apparatus is preferably of the type having a pivoted control member subjected to two opposing couples derived respectively from a barometric element and an energized resilient member, and more particularly of the form of this type apparatus described in U.S. Patent 2,729,780 issued to Harry Miller and Robert D. Love, January 3, 1956.

Accordingly, the static pressure apparatus comprises a partially evacuated bellows, 6, having the base thereof fixed with respect to the craft and the movable end linked to a control arm 7 for exerting a couple on the arm dependent on static pressure. This couple is resisted by an opposing couple derived from a pivotally-mounted torsion bar 8 to which arm 7 is transversely fixed. The opposing couple stems from a constraint on the pivotal movement of the torsion bar due to a further connection of the bar to one side of an irreversible transmission, the other side of which is connected to the drive shaft 9 of a motor 10.

When motor 10 is unenergized, expansions and contractions of bellows 6 in response to static pressure variations move arm 7 and thereby twist the torsion bar 8. The movement of arm 7 is sensed by an E-pickoff 11 whose armature and core portions are fixed, respectively, to arm 7 and the craft. Thus, if the armature of pickoff 11 is in a null or centered position for a given static pressure, a signal output from the pickoff is proportional to departures from the given static pressure and is of a phase dependent on the sense of such departures. This signal output is fed via a lead 12 to the movable arm of a 5-contact switch 13.

Contacts 3, 4, and 5 of switch 13 are connected via a lead 14 to the input of an amplifier 15 connected to energize motor 10. When the movable arm of switch 13 is on any one of these contacts, motor 10 drives in follow-up fashion through the irreversible transmission between it and torsion bar 8 until bar 8 is twisted sufficiently to balance any pressure-derived unbalancing couple thereon tending to electrically unbalance pickoff 10. A degenerative rate feedback signal for amplifier 15 is supplied through the corresponding contacts 3, 4 or 5 of a switch 16 identical to switch 13, by a tachometer-type generator 17 drivably coupled to motor 10.

The irreversible transmission that couples motor 10 to torsion bar 8 comprises a solenoid-controlled two-speed reduction gear unit 18 having its input connected to the motor's shaft 9. The output shaft 19 of reduction unit 18 is connected to a worm 20 which meshes with a worm-wheel 21 to provide the irreversible feature of the transmission. The output shaft of worm-wheel 21 is connected to one of a pair of logarithmic cams 22 and 23, constrained to rotate surface-to-surface, the other of the cam pair being connected to a pinion 24 meshing with a gear 25 fixed to one of the ends of torsion bar 8.

By the provision of the logarithmic cams 22 and 23, the shafts of motor 10 and of reduction unit 18 are positioned according to the logarithm of the static pressure (log $p$) that exists when pickoff 11 is nulled either by the maneuvering of the craft or by motor 10 when the movable arm of switch 13 is moved to its contacts 3, 4 or 5.

By the provision of the solenoid-controlled two-speed reduction gear unit 18, which may be a conventional planetary gear and clutch combination, the speed reduction between motor 10 and torsion bar 8 may be selected to be high (slow speed) or to be low (fast speed). The controlling solenoid 26 is serially connected with a battery 27 when the movable arm of a switch 28 identical to switches 13, 16 is placed on its contact 3. Thus energized, the solenoid places unit 18 in its slow condition. For all other positions of switch 28, solenoid 26 is unenergized to place unit 18 in its fast condition.

The identical switches 13, 16, and 28 and still others yet to be described, but having the same identicalness, are preferably ganged together by a common connection 29 to their respective movable arms. A manually-operated slector knob 30 is linked to connection 29 and actuates all of the ganged switches simulaneously to corresponding contact positions.

Besides being connected to the input of reduction unit 18 enroute to torsion bar 8, motor shaft 9 is connected via a reduction gear train 31 to the A.-C. excited rotor of a synchro generator 32 which is connected back-to-back with a synchro control transformer 33 for providing a (log $p$—log $q$) signal for the dynamic pressure apparatus to follow up on, as will later be described.

Contact 2 of switch 16, like the contacts 3, 4, and 5 thereof, is connected to the input of amplifier 15 so that the signal from rate generator 17 to the amplifier is by way of switch 16 for all switch positions except the one where the movable arm is on contact 1, a dead contact.

The connection between rate generator 17 and switch 16 is tapped by a lead 34 which feeds the rate signal to a mixer 35 where it is subtractively combined with the signal output of a potentiometer-type signal generator 36 whose wiper is driven by a motor 37 through a reduction gear train 38. Motor 37 is energized by an amplifier 39 in response to a signal obtained on an amplifier input lead 40 from a computer 41 which modifies a command signal fed to the computer from a signal generator 99 actuated by manual operation of the craft's pitch control column 100. Signal generator 99 is preferably of the stick force sensor type whose mounting and operation is substantially as described in U.S. Patent 2,398,421 issued to Carl A. Frische, George P. Bentley, and Percy Halpert, April 16, 1946. Accordingly, the generator or sensor 99 supplies a signal to computer 41 dependent upon the direction and magnitude of the force exerted by the operator on column 100. Computer 41 adjusts the level of the signal for a given force inversely according to the craft's Mach number, and the adjustment is directed to the use of this signal, as will later be described, for commanding a rate of change of pitch. Details of a suitable form for computer 41 will also be described later in connection with FIG. 2.

Degenerative rate feedback to amplifier 39 is provided by a tachometer-type generator 42 driven by motor 37. The output of mixer 35, proportional to the difference between the signals from rate generator 17 and potentiometer 36, is fed via a lead 43 to the movable arm of a 5-contact switch 44 included in the ganged connection of the other 5-contact switches.

Contact 1 of switch 44 is connected via a lead 45 to the input of amplifier 15; and contacts 2, 3, 4, and 5 are connected via a lead 46 to the input of amplifier 39. Thus, when switches 44, 16 are positioned to one of their respective contacts 2, 3, 4 and 5 and in the absence of a signal on lead 40, motor 37 is controlled in follow-up fashion to drive potentiometer 36 to maintain the output of potentiometer 36 equal to the output of rate generator 17. However, when switches 44, 16 are positioned to contact 1, the action is vice-versa. That is to say, motor 10 is then controlled in follow-up fashion to drive rate generator 17 to maintain the output of rate generator 17 equal to the output of potentiometer 36. Hence, if a signal appears on lead 40 due to the manipulation of control column 100, motor 10 twists torsion bar 8 at a rate dependent on the distance through which motor 37 is driven in response to such manipulation, this distance being proportional to the integral of the lead 40 signal since motor 37 is then operated in integrator fashion.

The signal on lead 12 resulting from the motor's twisting of torsion bar 8 is fed to contact 1 of a 5-contact switch 47 by way of a lead 48 connecting this contact with contact 1 of switch 13. Besides connecting the contacts 1 of switches 13 and 47, lead 48 also connects the contacts 2 of these switches. The movable arm of switch 47 is mechanically coupled to the ganging connection 29 and electrically coupled via a lead 49 to the input of a signal-responsive servomechanism 50 which may be a well-known position feedback type having an output linkage 51 drivably connected to the elevator surface 52 of the craft. Thus, when the ganged switches are positioned to one or the other of their respective contacts 1 and 2, the signal from pickoff 11 is fed to elevator servo 50. When the ganged switches are positioned to contacts 1, the craft, in order to maintain a substantially null output from pickoff 11 to elevator servo 50, must climb at the rate that torsion bar 8 is driven by motor 10 in response to the command signal from potentiometer 36. Hence, the position of knob 30 that places all the movable switch-arms on their respective contacts 1 is termed the rate of climb (R/C) position. On the other hand, when the ganged switches are positioned to contacts 2, the craft, in order to maintain a substantially null output from pickoff 11 to elevator servo 50, must remain at the pressure altitude then attained by the craft. Hence, the position of knob 30 that places all the movable switch-arms on their respective contacts 2 is termed the altitude-keeping (ALT) position.

Referring now to the dynamic pressure sensing apparatus in the present pressure sensing arrangement, the apparatus is seen to be identical in many respects to the static pressure sensing apparatus just described. That is to say, an amplifier 55 like amplifier 15 is provided to energize a motor 56 like motor 10. A generator 57 like generator 17 is driven by motor 56 to provide rate feedback degeneratively via a connection 58 from the generator to amplifier 55. Connection 58, however, has no switch in it comparable to switch 16, nor is there a tapped connection from generator 57 to an arrangement comparable to the rate of climb commanding arrangement 35—45.

The output shaft 59 of motor 56 is connected to the input side of an irreversible transmission whose output side is connected to one end of a torsion bar 60 like bar 8. A control arm 61 like arm 7 is transversely fixed to bar 60 so as to derive a resilient couple therefrom in opposition to a dynamic pressure couple from the movable end of a sylphon bellows 62. Unlike bellows 6, bellows 62 has an opening in its fixed base through which the dynamic or impact pressure of the atmosphere, received from a Pitot tube 63, is introduced internally of the bellows. A housing 64 surrounds and supports bellows 62, while a static tube 65 supplies static pressure to the housing externally of the bellows.

The irreversible transmission for the dynamic pressure apparatus corresponds element-for-element with the irreversible transmission for the static pressure apparatus. In this regard, motor shaft 59 is coupled to the input of a solenoid-controlled two-speed reduction gear unit 66 whose output drives torsion bar 60 through a worm and worm-wheel combination 67, a pair 68 of logarithmic cams, and a pinion and gear combination 69. A 5-contact switch 70 positionable by the ganging connection 29 is arranged like switch 27 so that only its contact 3 position connects a battery 71 in series with the controlling solenoid 72 of unit 66, thereby to shift the unit from its fast speed condition (contacts 1, 2, 4, and 5) to its slow speed condition.

Corresponding to the arrangement of pickoff 11, an E-pickoff 73 has its armature fixed to control arm 61 and provides a signal of variable magnitude and reversible phase on its output lead 74 according to the unbalance of the opposed couples (dynamic pressure and resilient) on the arm. Lead 74 connects with contacts 1, 2, and 5 of a 5-contact switch 75 and with contatcts 3 and 4 of a 5-contact switch 76. The movable arm of switch 75 is electrically connected via a switch 75' to the input lead 77 of amplifier 55, and the movable arm of switch 76 is electrically connected via a lead 78 to contacts 3 and 4 of switch 47; both movable arms are mechanically linked to ganging connection 29 for actuation.

The rotor of synchro control transformer 33 is drivably coupled to motor shaft 59 via a reducing gear train 79. The signal induced in the control transformer's rotor is fed to contact 3 of switch 75 via a connection 80. Contact 4 of switch 75 is a dead contact, as are contacts 1, 2, and 5 of switch 76 and contact 5 of switch 47.

In view of the logarithmic cams 68 in the irreversible transmission, the respective shafts of motor 56, synchro control transformer 33, and reduction unit 66 are angularly positioned according to the logarithm of the dynamic pressure (log $q$) when pickoff 73 is nulled either by motor 56 or by the maneuvering of the craft. Motor 56 is controlled by switches 75, 76 to null the pickoff 73 when the movable arms of these switches are moved to their respective contacts 1, 2, or 5.

Since contacts 1 and 2 are engaged when knob 30 is positioned to R/C and ALT, respectively, it is evident that the dynamic pressure apparatus is controlled to follow-up on the dynamic pressure $q$ while rate of climb or altitude control signals are being fed via leads 48, 49 to elevator servomechanism 50.

While contacts 5 are engaged, both the dynamic pressure apparatus and the static pressure apparatus followup on their respective pressures $q$ and $p$. And since contact 5 of switch 47 is a dead contact, no signal from the pressure sensing arrangement is fed on lead 49 to elevator servomechanism 50. Elevator 52 is then actuated solely in response to the signal components on another input lead 80 to servomechanism 50 to maintain a reference pitch attitude called for by this signal, as will be described subsequently in greater detail. Accordingly, the contact 5 position to which knob 30 may be adjusted is designated the PITCH position.

While contacts 4 are engaged, motor 56 is deenergized and the output of pickoff 73, which is proportional to deviations in dynamic pressure $q$ from that which is attained for the airspeed existing just prior to the engaging of contacts 4, is fed via leads 74, 78, 49 to the elevator servomechanism. Thus, elevator 50 is positioned to counteract the variations in airspeed that produce the dynamic pressure variations. Accordingly, the contact 4 position to which knob 30 may be adjusted is designated the airspeed-keeping (A/S) position. In this position of knob 30, the static pressure apparatus is controlled by switch 13 to follow-up on the static pressure $p$.

Mach number is a direct function of the ratio $q/p$, hence a direct function also of (log $q$ — log $p$). Therefore, a departure from a given value of (log $q$ — log $p$) amounts to a departure from a given Mach number.

Because the rotors of synchros 32 and 33 are positioned respectively in accordance with log $p$ and log $q$, the signal generated in the rotor of synchro 33 and in connection 80 is proportional to (log $q$ — log $p$).

For the contact 3 position of knob 30, which is the position to which the knob is turned in FIG. 1, the static pressure apparatus follows up on the static pressure $p$. However, in the dynamic pressure apparatus, the contact 3 position of switch 75 connects the (log $q$ — log $p$) signal in the rotor of synchro 33 to the input of amplifier 55, while the switches 76, 47 connect the signal in pickoff 73 to the elevator servomechanism 50. Then before there is any change in altitude, motor 56 drives the rotor of synchro 33 into a null output position, which might require a rotor rotation of as much as 180°. But in driving the synchro 33 rotor through as much as 180°, motor 56 barely displaces the armature of pickoff 73 from its null output position. That is to say, the speed reduction in the irreversible transmission between motor 56 and torsion bar 60 is so much greater than that between motor 56 and the synchro 33 rotor, even with reduction unit 66 actuated to its fast condition, that for all practical purposes the Mach number that exists when contacts 3 are first engaged is the same Mach number that exists after the synchro 33 rotor is initially driven to its nearest null. Similarly, the speed reduction in the irreversible transmission between motor 10 and torsion bar 8, even with reduction unit 18 actuated to its fast condition, is many times greater than the speed reduction of the reduction gear train 31 between motor 10 and the synchro 32 rotor.

Thereafter, in the contact 3 position of the ganged switches, if the altitude of the craft should change, the follow-up action of the static pressure unit drives the synchro 32 rotor according to resulting changes in log $p$. As the synchro 32 rotor is angularly displaced, the unbalanced signal thereby developed in the synchro 33 rotor energizes motor 56 to cause the synchro 33 rotor to rotate closely in step with the rotation of the synchro 32 rotor. In this fashion, the synchro 33 rotor may be driven through several revolutions in following up on a like number of revolutions of the synchro 32 rotor. And while the synchro 33 rotor is being driven by motor 56, torsion bar 60 is also being twisted by motor 56. The resultant change in the resilient couple on control arm 61 is such that bellows 62 will wholly counteract such change with an opposing dynamic pressure couple if the airspeed is changed to produce the dynamic pressure whose logarithm is represented by the angular position of the synchro 33 rotor when the output of this rotor is nulled. The requisite change in airspeed is produced by the response of elevator 52 to the signal from pickoff 73. Thus, after contacts 3 are engaged, if the craft's altitude should change, the craft's airspeed is changed through elevator control to substantially maintain the Mach number existing at the engagement of contacts 3. Accordingly, the contact 3 position to which knob 30 may be adjusted is designated the Mach-keeping (MACH) position.

As earlier noted, the contact 3 (MACH) position of the ganged switches places reduction units 18, 66 in their respective slow conditions of operation, while all other switch positions actuate a fast condition of operation. The reason for this is that changes in altitude and airspeed are apt to occur considerably more rapidly when the system is out of its Mach-keeping control mode. Hence, higher transmission speeds are then required in the respective follow-up loops in order to maintain close enough follow-up operation or synchronization so that no step-like control signals can appear on the servomechanism input lead 49 to produce a control transient when control is switched by knob 30 from one mode to another.

Switch 75' is a two-position switch normally positioned to connect the movable arm of switch 75 to input lead 77 of amplifier 55. If, however, a change is desired in the Mach number being maintained while selector knob 30 is positioned to MACH, switch 75' is positioned to its second position which disconnects amplifier lead 77 from switch 75 and connects lead 77 to the phase-reversing output of an adjustable signal generator 81 (beep controller) having an adjusting knob 82. A linkage 82' preferably connects knob 82 to switch 75' so that the switch is actuated to energize amplifier from signal generator 81 whenever the knob is displaced from a zero output detent position. As long as knob 82 is so displaced, the signal from signal generator 81 slews motor 56 to slowly twist torsion bar 60 to command a changing airspeed. When the desired Mach number is reached, the knob is returned to its detent, thereby reconnecting the synchro 33 rotor to amplifier 55. The synchro 33 rotor, having been driven rapidly relative to the torsion bar, is then driven slightly further to its nearest null (no more than 180° rotor rotation), which null the craft is thereafter controlled to maintain. Hence, the desired new Mach number is maintained, as when contacts 3 are first engaged.

Signal generator 81 may also be employed to bring about a desired change in the airspeed maintained while selector knob 30 is positioned to A/S. In this regard, it is operated exactly as in the MACH mode, except that its displacement from a zero output condition is only for the time required to provide the change in torsion bar twist or resilient couple needed to cause pickoff 73 to call for the new airspeed.

The description thus far has been primarily concerned with the integrated pressure sensing arrangement which supplies control signals to servomechanism 50 for causing the craft to make the departures from a reference pitch attitude that are necessary to maintain, by choice, a given rate of climb, a given altitude, a given Mach number, or a given airspeed. Now the arrangement for defining the reference pitch attitude will be described, including the provision made for commanding a desired rate of change of pitch, where the command is automatically compensated inversely according to Mach number.

The reference pitch attitude is defined principally by a gyroscopic vertical 83 having the usual pickoff on its pitch axis for supplying a signal according to departures of the craft from a reference pitch attitude. The signal from the pitch pickoff of gyroscope 83 is fed via a lead 84 to a mixer 85 where it is mixed with signal components fed to the mixer via a lead 86 from a mechanically driven signal generator 87. The output of mixer 85 is fed via lead 80 to elevator servomechanism 50.

Signal generator 87 supplies a signal according to the distance through which it is driven, and in this regard it forms the output element of an integrator apparatus. Besides generator 87, the integrator apparatus comprises an amplifier 88 having its output connected via a lead 89 to a motor 90 which is mechanically connected both to the drive shaft of a tachometer-type generator 91 and via a reduction gear train 92 to the drive shaft of signal generator 87. The rate signal output of generator 91 is degeneratively fed back to amplifier 88.

Three signals are integrated by the integrator apparatus for producing the signal components on lead 86 that are mixed in mixer 85 with the gyroscopically-derived pitch signals on lead 84. One of these signals is supplied to integrator amplifier 88 via a lead 93 and contacts 1, 2, 3, and 4 of a 5-contact switch 94 in the ganged connection of switches by a signal-generating linear accelerometer 94' arranged in the craft so that its signal is proportional to accelerations normal to the craft's longitudinal axis. Contact 5 of switch 94 is a dead contact. Another of the signals is supplied to integrator amplifier 88 via a lead 95 from the movable arm of switch 47. The third signal is supplied to integrator amplifier 88 via a lead 96 and a two-position switch 97 from the output of computer 41 which, as earlier stated, modified a command signal fed to the computer from the stick force sensor or signal generator 99 actuated by manual operation of the craft's pitch control column 100. Accordingly, the generator or sensor 99 supplies a signal to computer 41 dependent upon the direction and magnitude of the force exerted by the operator on column 100. Computer 41, in the path of this signal enroute to integrator amplifier 88, adjusts the level of the signal for a given force inversely according to the craft's Mach number, as will now be described with the aid of FIG. 2.

In FIG. 2, computer 41 is seen to comprise three potentiometers 101, 102, and 103 having windings respectively of resistance R1, R2, and R3. The movable arms of potentiometers 101 and 102 are mechanically positioned according to the logarithm of the static pressure $p$ by a linkage 104 coupled to the output shaft 19 (FIG. 1) of the two-speed reduction unit 18. The movable arm of potentiometer 103 is mechanically positioned according to the logarithm of the dynamic pressure $q$ by a linkage 105 coupled to the output shaft (FIG. 1) of the two-speed reduction unit 66.

The windings R2 and R3 are connected in series and one side of the series combination is connected via a lead 106 to an input terminal 107 for the computer. The other side is connected to the movable arm of potentiometer 101.

The other input terminal 108 for the computer is connected via a lead 109 to one side of R1, the other side of R1 having no connections thereto. The output from computer 41 is taken from across the movable arms of potentiometer 102 and 103 via a pair of leads 110 and 111, respectively.

The values of the resistances R, R1 and R3 are chosen so that the output ($e_{out}$) on leads 110 and 111 is $$(1) \qquad e_{out} = \frac{R3+R2}{K+R1} \cdot e_{in}$$

where $e_{in}$ is the input on leads 106, 109 and K is a constant whose value is determined empirically. By this arrangement, the close approximation $$(2) \qquad e_{out} \cong \frac{e_{in}}{M}$$

is obtained, where M is the Mach number of the craft. Thus, for a given force exerted on control column 100, the signal appearing on input lead 96 of integrator amplifier 88 will have a magnitude inversely proportional to the craft's Mach number. Similarly, the signal appearing on input lead 40 of amplifier 39 will likewise have a magnitude which varies inversely with the craft's Mach speed, the double lead output of computer 41 being subsequently schematicaly illustrated as a single lead in order to simplify the drawings, it being understood that such single lead illustration denotes a parallel connection of the signal from the output of computer 41 to the inputs 96 and 40 of amplifiers 88 and 39, respectively.

A mechanical connection 112 (FIG. 1) is made from a point on column 100 below the column's mounting pivot 113 to elevator 52 by which the elevator may be manually positioned when servomechanism 50 is rendered ineffective, as for example, by the disengagement of the servomechanism from the elevator by conventional clutch means (not shown). When the elevator is under manual control, the two-position switch 97 is positioned by the operator to the position designated "MAN." This connects the mixer output on lead 80 via a lead 114 to input lead 96 of integrator amplifier 88, so that signal generator 87 is driven in follow-up fashion to produce a signal that cancels, in mixer 85, the gyroscopically-derived signal on mixer input lead 84.

The follow-up connection 114 is broken when switch 97 is positioned by the operator to the position designated "AUTO," and, simultaneously, input lead 96 of integrator amplifier 88 is connected to the output of computer 41. Switch 97 is positioned to "AUTO" when elevator 52 is placed under automatic pilot control, that is, when servomechanism 50 is rendered effective. Thus, due to the follow-up action of the integrator apparatus when switch 97 is positioned to "MAN," the subsequent positioning of this switch to "AUTO" produces no instantaneous step-like signal on servo input lead 80; hence no control transient results.

The integration that is given the accelerometer-derived signal on lead 93 while elevator 52 is under the control of one of the signals from the pressure-sensing arrangement (i.e., a signal proportional to rate of climb) is for the purpose of producing a signal component dynamically equivalent to the gyroscopically-derived pitch signal (i.e., a signal proportional to rate of climb) and which will reinforce the latter to prevent a control instability that might otherwise result due to a high path error to pitch signal ratio.

The accelerometer-derived signal is substantially reduced to zero during steady flight. On the other hand, the pitch signal will not, in general, be reduced to zero. In the PITCH mode, however, pressure-derived signals are disconnected from lead 49, hence the integrated acceleration component is not needed. Accordingly, accelerometer 94' is disconnected from integrator amplifier 88 through the dead contact 5 of switch 94 when the PITCH mode is engaged.

The integration that is given the signals on lead 95 from the pressure-sensing arrangement is for the purpose of providing a signal component on lead 86 that replaces such portions of the lead 95 signals that must be sustained prolongedly to bring about the requisite rate of climb, altitude, Mach number, or airspeed, as the case might be. The value of this signal component just before the PITCH mode is selected is thereafter retained for the assistance it inherently provides by way of tending to relieve the gyroscopic vertical of maintaining a sustained output in order to keep the craft at the reference pitch attitude.

Lastly, the integration that is given the Mach-compensated command signal obtained from stick force sensor 99 is for the purpose of providing a signal component on lead 86 that commands a rate of change of pitch proportional to the manual force exerted on the craft's control column 100. The inverse nature of the Mach compensation insures that a smaller pitch rate is commanded for a given stick force in the presence of a higher Mach number, and vice-versa.

The same signal that is fed from sensor 99 via computer 41 to input lead 96 of integrator amplifier 88 is fed to input lead 40 of the rate of climb command amplifier 39, as earlier described. Thus, when mode selector knob 30 is positioned to R/C, a manipulation of control column 100 causes a rate of change of pitch to be commanded at the same time that it causes a rate of climb to be commanded. When the operator observes that the craft has attained the desired climb rate, he releases control column 100 to restore sensor 99 to a zero output condition. This halts the driving of signal generator 87 in response to the integral of the sensor's output, hence prevents further change in the craft's pitch in response to such integral. At this time, however, potentiometer 36 will have been driven to a position where its output command torsion bar 8 to be twisted at a rate to cause pickoff 11 to call for the desired climb rate. Potentiometer 36 retains this position, hence "remembers" the commanded rate of climb, notwithstanding the release of control column 100.

Resetting of potentiometer 36 to a zero output condition occurs when the system is switched from the R/C mode to any one of the other modes, since motor 37 is then caused to follow-up on the output of potentiometer 36.

While pitch rate commands in the PITCH mode and pitch rate commands together with climb rate commands in the R/C mode are initiated in response to the output of stick force sensor 99, it is to be understood that a signal generating means other than a force sensor on the control column may be employed to provide the signals on leads 96, 40 to amplifiers 88, 39 respectively. That is to say, a simple manually adjustable signal generator having a reversible phase output may be employed instead. In fact, such a signal generator would be compatible with the column-mounted sensor 99, so that both devices could readily be employed in parallel if desired.

Since many changes could be made in the above construction and many apparently widely different embodiments of this invention could be made without departing

What is claimed is:

1. Aircraft Mach number control apparatus comprising a dynamic pressure sensor device of the force-balancing type having a pickoff for providing a signal according to a dynamic pressure induced force thereon and having a motor normally responsive to said signal for adjusting a resilient member coupled to said pickoff, said motor driving said resilient member through a first motion transmission means to balance said dynamic presure induced force, said first motion transmission means including logarithmic means arranged so that the angular distance through which said motor drives to balance said dynamic pressure induced force is proportional to the logarithm of the dynamic pressure, a first variable transformer device having a rotor and a stator, means including second motion transmission means for coupling said first transformer rotor to the output of said motor so that said rotor is positioned according to said dynamic pressure logarithm when said motor responds to said pickoff signal, a second variable transformer device having a rotor and a stator, a reference source of A.-C. excitation voltage connected to said second transformer rotor, said second transformer stator being connected to said first transformer stator, means for positioning said second transformer rotor according to the logarithm of the static pressure so that a signal is generated in said first transformer rotor proportional to the difference between said pressure logarithms, means operable to interrupt the response of said motor to said pickoff signal and to simultaneously cause the motor to respond to said first transformer rotor signal so that said first transformer rotor is driven to its nearest null output position, the motion transmitted by said first transmission means for a given motor driving distance being sufficiently less than the motion transmitted by said second transmission means so that the positioning of said first transformer rotor to said nearest null position thereof causes a negligible simultaneous adjustment of said resilient member, whereby said pickoff signal calls for a maneuvering of said craft to substantially maintain the difference existing between said pressure logarithms when said operable means is operated.

2. In a Mach number speed control system for aircraft, the combination comprising a first pressure-responsive means of the force balancing type having a signal pickoff device actuated in accordance with static pressure, a first motive means responsive to said pickoff signal for driving said pickoff device in a direction and to an extent to maintain said signal substantially nulled, and motion transmission means coupled betwen said motive means and said pickoff device for causing motor to drive in accordance with the logarithm function of said static pressure whereby the position of said motor corresponds to the logarithm of static pressure, a second pressure-responsive means having a signal pickoff device actuated in accordance with dynamic pressure, a second motive means normally responsive to said pickoff device for driving said second pickoff device in a direction and to an extent to maintain said signal substantially nulled, and a second motion transmission means coupled between said second motive means and said second pickoff device for causing said second motive means to drive in accordance with the logarithm function of said dynamic pressure whereby the position of said second motor corresponds to the logarithm of dynamic pressure, and signal generating means connected to be differentially driven by each of said motive means whereby to provide an output signal proportional to the difference between said pressure logarithms.

3. Apparatus as set forth in claim 2 wherein said signal generating means comprises a pair of rotary transformers having the stators thereof electrically connected and rotors thereof respectively coupled with each of said motive means, and a reference source of excitation voltage connected to one of said transformers whereby the other of said transformers supplies an output in accordance with the difference in the positions of the rotors thereof.

4. A Mach number speed measuring system for aircraft comprising a first pressure-responsive means of the force balancing type having a signal pickoff device actuated in accordance with static pressure, a first motive means responsive to said pickoff signal for driving said pickoff device in a direction and to an amount to maintain said signal substantially nulled, and motion transmission means coupled between said motive means and said pickoff device for causing said motor to drive in accordance with the logarithm function of said static pressure whereby the position of said motor corresponds to the logarithm of static pressure, a second pressure responsive means having a signal pickoff device actuated in accordance with dynamic pressure, a second motive means responsive to said second pickoff device for driving said second pickoff device in a direction and to an amount to maintain said signal substantially nulled, and a second motion transmission means coupled between said second motive means and said second pickoff device for causing said second motive means to drive in accordance with the logarithm function of said dynamic pressure whereby the position of said second motive means corresponds to the logarithm of dynamic pressure, and computer means having first and second inputs responsive to the operation of both of said motive means for providing a signal output varying in accordance with the Mach number speed of said craft.

5. Apparatus as set forth in claim 4 wherein said computer means comprises a source of voltage and potentiometer means energized thereby, and means for adjusting said potentiometer means in accordance with the outputs of said motive means.

6. Apparatus as set forth in claim 4 wherein said computer comprises a circuit including a source of voltage and a potentiometer network, the windings of two potentiometers being connected in series between one terminal of said source and the wiper of the remaining potentiometer, the wipers thereof being connected to be driven by said first and second motive means respectively, one end of the winding of the latter potentiometer being open and the other end connected to the other terminal of said source, the wiper of said remaining potentiometer also being driven by said second motive means, and the voltage output of said circuit being that across the wipers of said first two potentiometers.

References Cited in the file of this patent

UNITED STATES PATENTS

| | | |
|---|---|---|
| 2,629,569 | Andrews | Feb. 24, 1953 |
| 2,706,407 | Hosford | Apr. 19, 1955 |
| 2,792,685 | Constantine et al. | May 21, 1959 |
| 2,923,153 | Westman | Feb. 2, 1960 |